US011575669B2

(12) United States Patent
Richards

(10) Patent No.: US 11,575,669 B2
(45) Date of Patent: Feb. 7, 2023

(54) COMPUTER PLATFORM AND METHOD FOR SECURELY EXCHANGING CONFIDENTIAL DATA AND GENERATING LEGAL DOCUMENTS

(71) Applicant: Law on Earth IP Pty Ltd., Brisbane (AU)

(72) Inventor: Katie Richards, Brisbane (AU)

(73) Assignee: Law on Earth IP Pty Ltd, Brisbane (AU)

(*) Notice: Subject to any disclaimer, the term of this patent is extended or adjusted under 35 U.S.C. 154(b) by 169 days.

(21) Appl. No.: 16/939,851

(22) Filed: Jul. 27, 2020

(65) Prior Publication Data

US 2021/0029114 A1    Jan. 28, 2021

Related U.S. Application Data

(60) Provisional application No. 62/879,477, filed on Jul. 28, 2019.

(51) Int. Cl.
  *G06Q 50/18*  (2012.01)
  *G06Q 50/26*  (2012.01)
  (Continued)

(52) U.S. Cl.
  CPC ........ *H04L 63/0861* (2013.01); *G06F 21/602* (2013.01); *G06F 21/6218* (2013.01);
  (Continued)

(58) Field of Classification Search
  None
  See application file for complete search history.

(56) References Cited

U.S. PATENT DOCUMENTS 7,263,491 B1 * 8/2007 Geldermann .......... G06Q 90/00
                                                                    705/76
8,255,800 B2   8/2012 Moore et al.
(Continued)

FOREIGN PATENT DOCUMENTS

| EP | 2913788 A1 * | 9/2015 | ........... G06F 17/243 |
| WO | WO-2006014727 A1 * | 2/2006 | ............ G06F 16/31 |
| WO | WO-2013055818 A1 * | 4/2013 | ....... G06F 17/30345 |

OTHER PUBLICATIONS

Information Extraction from Legal Documents. Cheng. IEEE. (Year: 2009).*

(Continued)

*Primary Examiner* — Venkat Perungavoor
(74) *Attorney, Agent, or Firm* — Rankin, Hill & Clark LLP

(57) ABSTRACT

Computer-implemented systems and methods for providing secure exchange of confidential data including: a user database including a user profile that includes user identification data including user biometric data; a verification module that compares biometric data received from a computing device being used by a user attempting to access the system against the stored user biometric data to verify the user's identity; a legal database including data useable according to requirements of a specific legal jurisdiction; a geographical engine that uses geographical location data associated with the computing device being used by the user to tag the user as being associated with the specific legal jurisdiction; and a compiler that, in response to an inquiry received from the computing device being used by the user, compiles a legal document compatible according to specific legal standards of the legal jurisdiction associated with the user and sends the legal document to the user.

13 Claims, 14 Drawing Sheets

(51) Int. Cl.
*H04L 9/40* (2022.01)
*G06F 21/62* (2013.01)
*G06F 21/60* (2013.01)
*G06Q 30/00* (2012.01)
*G06Q 30/02* (2012.01)
*G06Q 10/10* (2012.01)
*G06N 3/08* (2006.01)
*H04L 67/306* (2022.01)
*G10L 17/06* (2013.01)
*G06V 40/16* (2022.01)
*H04L 61/5007* (2022.01)
*H04L 67/52* (2022.01)

(52) U.S. Cl.
CPC ............... *G06N 3/08* (2013.01); *G06Q 10/10* (2013.01); *G06Q 30/0185* (2013.01); *G06Q 30/0205* (2013.01); *G06Q 50/18* (2013.01); *G06Q 50/265* (2013.01); *G06V 40/172* (2022.01); *G10L 17/06* (2013.01); *H04L 61/5007* (2022.05); *H04L 63/102* (2013.01); *H04L 63/107* (2013.01); *H04L 67/306* (2013.01); *H04L 67/52* (2022.05); *G06Q 2220/00* (2013.01)

(56) References Cited

U.S. PATENT DOCUMENTS

| | | | |
|---|---|---|---|
| 10,255,419 B1* | 4/2019 | Kragh | H04L 9/3297 |
| 11,322,237 B1* | 5/2022 | Salzbrenner | G06F 3/0484 |
| 2015/0212997 A1* | 7/2015 | Kassim | G06Q 50/18 |
| | | | 715/226 |
| 2022/0084148 A1* | 3/2022 | Ems | G06F 40/174 |

OTHER PUBLICATIONS

Using AI for e-Government Automatic Assessment of Immigration Application Forms. Chun. (Year: 2007).*
Natural Language Processing in Law Based Search Engine. Dharmsiri. (Year: 2016).*
An AI Framework for the Automatic Assessment of e-Government Forms . Chun. AI Magazine. APIAR. (Year: 2008).*

* cited by examiner

100 ⏋

STEP 1: Go to Dashboard ⸺116

| 📖 0 articles in Learning Centre | ✨ 0 items in Document Wizard | 📹 1 booked Video Sessions | 👆 Get Verified Verification Of Identity |

STEP 2: Click on Get Verified ⸺104

| Verification of Identity | + New VOI Application |

So that Advisors comply with their legal requirements, it is critical that we verify your identification before you can book any sessions. Any information and identification uploaded is encrypted and stored with banking grade security so you can be confident your data is safe. You'll see below all VOI applications you've made - each one lasts 2 years. You can edit an application once you've started it if you don't have all the information you need at the time.

STEP 3: Click on New Application, Fill in details and upload relevant ID until you reach at least 100 points

| Full Legal Name | First Name | Middle Name | Last Name |
| Date of Birth | dd/mm/yyyy |
| Residential Address | Unit | Street Address |
| | Address Line 2 |
| | Suburb / City | Postcode |
| | Select Country ▼ | State |
| Uploaded Documents (0 points) | Select document ▼ — |
| | + |
| | ▲ Submit Application |

| Uploaded Documents (140 points) | Australian Birth Certificate (70 points) ▼ — |
| | Document Number | Issue date (dd/mm/yyyy) |
| | Choose file | Browse |
| | Australian Passport (70 points) ▼ — |
| | Document Number | Issue date (dd/mm/yyyy) |
| | Choose file | Browse |
| | ▲ Submit Application |

ASIC process
- customer searches for name availability
- customer fills in all details like structure, officeholders etc.
- platform is validating all the data, addresses (against Google db) and steps
- customer pays and the platform prepares the request to ASIC
- every 3 minutes LOE interrogates ASIC for status update
- if the application triggers an error (validation, rejection, etc.) customer is informed and they can amend and resubmit the application
- if the application gets approved, the documents are generated instantly and they're provided to the client along with the certificate provided by ASIC

Document wizard process
- LOE defines the docx documents, the variables and the logic
- a document template is created following the specs
- for more than 60% of the docs, custom procedures come into place
- customer can invite other users to collaborate on the document
- once happy, they can finalise the document and download it
- the document and the data is available only to the owner of the doc
- they can unlock the doc and make amendments

Searches process
- a search is defined in LOE with all the custom actions and processes
- customer purchases a search and they provide the details of the search
- LOE prepares and sends the request to GlobalX
- every 3 minutes LOE interrogates GlobalX for status update
- if the search triggers an error (validation, rejection, etc.) customer is informed and they can amend and resubmit the search
- if the search gets approved, the reports are generated instantly based on GlobalX raw data and they are presented to the client

FIG. 4

Calendar Settings — 128

| Day | Start Interval | End Interval | |
|---|---|---|---|
| Monday | 09:00 ▼ | 11:00 ▼ | |
| | 13:00 ▼ | 15:00 ▼ | |
| | Start Interval ▼ | End Interval ▼ | |
| Tuesday | 09:00 ▼ | 11:00 ▼ | |
| | 13:00 ▼ | 15:00 ▼ | |
| | Start Interval ▼ | End Interval ▼ | |
| Wednesday | 09:00 ▼ | 11:00 ▼ | |
| | 13:00 ▼ | 15:00 ▼ | |
| | Start Interval ▼ | End Interval ▼ | |
| Thursday | 09:00 ▼ | 11:00 ▼ | |
| | 13:00 ▼ | 15:00 ▼ | |
| | Start Interval ▼ | End Interval ▼ | |
| Friday | 09:00 ▼ | 11:00 ▼ | |
| | 13:00 ▼ | 15:00 ▼ | |
| | Start Interval ▼ | End Interval ▼ | |
| Saturday | 09:00 ▼ | 11:00 ▼ | |
| | 13:00 ▼ | 15:00 ▼ | |
| | Start Interval ▼ | End Interval ▼ | |
| Sunday | 09:00 ▼ | 11:00 ▼ | |
| | 13:00 ▼ | 15:00 ▼ | |
| | Start Interval ▼ | End Interval ▼ | |

Save

Edit Profile Information — 126

Welcome to your profile! It's essential to keep your information updated at all times. We'd love for you to add a profile picture and your company logo. Use your bio to tell us a bit about you and best describe what you do! It's essential you put in the State/s and the field/s of law that you are experienced in and permitted to practice in. To provide your availability, you can select up to three chunks of time each day so you can fit video sessions in around your life commitments each day, e.g. 9-11am then 4-6pm then 8-9pm.

Personal Details

| Full Name | Katie |
|---|---|
| E-mail Address | |
| Profile Details | |
| Profile Image | 156195742.jpg  Browse |
| Bio | Insert bio — 130 |

Professional Details

| Job Title | 156195742.jpg |
|---|---|
| Company | Insert Company |
| Company Logo | 156195742.jpg  Browse |
| States | ×QLD |
| Areas of Expertise | ×Contract Reviews ×Agreement Drafting ×Independent Contractors ×Due Diligence ×Start-up Strategy ×Governance & Risk |

FIG. 5

132     Data encryption & protection
- LOE uses AES-256 encryption standard, including cookies and sessions
- encrypted storage on S3 with SSE-S3 AES-256
- encrypted data in transit with SSL/TLS certificates SHA256 RSA
- strict access levels for LOE staff
- no FTP policy
- SSH only access with SSH keys from nominated IP addresses
- basic WAF and DoS protection
- DDoS protection (to be implemented)

FIG. 6

Advisors
Queensland

Given the laws change from State to State, ensure the State noted above is where you need the document prepared for, or is the State in which your legal issue is happening in. Choose the field of law you need advice on, by clicking on the major advice area headings on the left and then drilling down. Or just use the search bar. Then see below for up to 5 suggested advisors for you to choose from. Feel free to instant chat them to see if they're the right fit for you.

WELCOME
Katie XXXXX

Queensland

Business
Estates, Wills & Powers of Attorney
Property Law
Personal Injuries Law
Litigation / Court Search...

Katie XXXXX
xxx@bigpond.com

Terrina Panincic
Freelance Lawyer @ The Freelance Lawyer #1

Martin Rogalski
Director @ Rogalski Lawyers

Martin Rogalski  
Director @ Rogalski Lawyers  
Joined 01 July 2019

138

Martin Rogalski  
Director  
Rogalski Lawyers

Areas of expertise  
Workplace Injuries, Car Accidents, Other Accidents, Small Claims, Consumer Law Disputes, Medical Negligence, Magistrates Court, District Court, Supreme Court

■ Send a message  
■ Schedule a video call

Joined 01 July 2019

☐ ☐ ☐ ☐  
♡

Status  
QLD, ALL

Bio  
Martin is a highly respected and sought after compensation lawyer. Martin is an accredited specialist in personal injury law and a multiple recipient of Doyle's Guide. Martin has acted for claimants in all areas of compensation law in multiple juristictions within Australia and overseas with an enviable record of success. Martin is the founder of Rogalski Lawyers.

Back to advisors ↺

Advisor Contact Form

Your Message

■ Send message to Martin Rogalski

Verification of Identity

You do not have a valid VOI application.

| | |
|---|---|
| Roles | 6 |
| Users | 49 |
| Authors | 16 |
| Categories | 154 |
| Articles | 257 |
| News | 4 |
| FAQs | 37 |
| Pages | |
| Templates | 101 |
| VOIs | 0 |
| Video Sessions | 1 |
| Companies | 2 |

Dashboard
My Advisors
My Articles
My Documents
My Companies
My Video Sessions
My VOIs

Verification of Identity (Incomplete)  ↺ Back

So that advisors can comply with their legal requirements, it is critical that we verify your identification before you can book any advice sessions. Any information and identification uploaded is encrypted and stored with banking grade security so you can be confident your data is safe. You'll see below all VOI applications you've made - each on lasts 2 years. You can edit an application ...e information you

⊗

You do not have a valid VOI application

...me | Last Name

Address | Address Line 2
Suburb / City | Postcode
Select Country ▼ | State

Uploaded Documents | Select document ▼
(0 points)

◀ Submit Application

FIG. 7C

Verification of Identity (Incomplete)　　　　↺ Back

So that advisors can comply with their legal requirements, it is critical that we verify your identification before you can book any advice sessions. Any information and identification uploaded is encrypted and stored with banking grade security so you can be confident your data is safe. You'll see below all VOI applications you've made - each on lasts 2 years. You can edit an application once you've started it if you don't have all the information you need at the time.

| Full Legal Name | Katie | Middle Name | Surname |
|---|---|---|---|

Date of Birth: dd/mm/yyyy

Residential Address:
- Merthry Road
  - ♦ Merthry Road Teneriffe OLD, Australia
  - ♦ Merthry Road Cardiff, UK
  - ♦ Merthry Road Pontypridd, UK
  - ♦ Merthry Road Abergavenny, UK
  - ♦ Merthry Road Northampton, UK
- Address Line
- Suburb / City
- Select Country Uploaded Documents (0 points): Select document ▼ −

＋

◂ Submit Application

FIG. 7E

Verification of Identity (Incomplete)  ↺ Back

So that advisors can comply with their legal requirements, it is critical that we verify your identification before you can book any advice sessions. Any information and identification uploaded is encrypted and stored with banking grade security so you can be confident your data is safe. You'll see below all VOI applications you've made - each on lasts 2 years. You can edit an application once you've started it if you don't have all the information you need at the time.

| Full Legal Name | Katie | Middle Name | Surname |
|---|---|---|---|
| Date of Birth | dd/mm/yyyy | | |
| Residential Address | XX | XXXXXXXX | |
| | Address Line 2 | | |
| | Suburb / City | | XXXX |
| | Country ▼ | | State |

Uploaded Documents (110 points)

- Passport (70 points) ▼ —
  - Passport number | Passport date
  - Cert.ID - License&Passport.pdf | Browse
- Driver's License (40 points) ▼ —
  - License number | Expiry date
  - Queensland ▼
  - DriversLicense - Front&Back.pdf | Browse

+

▸ Submit Application

| Verification of Identity | + New VOI Application |
|---|---|
| So that Advisors comply with their legal requirements, it is critical that we verify your identification before you can book any sessions. Any information and identification uploaded is encrypted and stored with banking grade security so you can be confident your data is safe. You'll see below all VOI applications you've made - each one lasts 2 years. You can edit an application once you've started on it if you don't have all the information you need at the time. ||
| Application was submitted! ||
| Katie (22/07/2019 to 22/07/2021) | (pending) |

FIG. 7H

| Verification of Identity (pending) | ↺ Back |
|---|---|
| So that Advisors comply with their legal requirements, it is critical that we verify your identification before you can book any sessions. Any information and identification uploaded is encrypted and stored with banking grade security so you can be confident your data is safe. You'll see below all VOI applications you've made - each one lasts 2 years. You can edit an application once you've started on it if you don't have all the information you need at the time. ||

| Full Legal Name | KATIE |
|---|---|
| Date of Birth | |
| Residential Address | |
| Uploaded Documents | Australian Passport ⬇ |
| | |
| | Australian Driver's License ⬇ |
| | |
| Email Address | |
| Status | Pending |
| Compliance Officer Messags | |
| ✓ Approve  ⊘ Reject | ✎ Edit |

FIG. 7I

Verification of Identity (approved)  ↶ Back

So that Advisors comply with their legal requirements, it is critical that we verify your identification before you can book any sessions. Any information and identification uploaded is encrypted and stored with banking grade security so you can be confident your data is safe. You'll see below all VOI applications you've made - each one lasts 2 years. You can edit an application once you've started on it if you don't have all the information you need at the time.

| | |
|---|---|
| Full Legal Name | KATIE |
| Date of Birth | |
| Residential Address | |
| Uploaded Documents | Australian Passport |
| | Australian Driver's License |
| Email Address | |
| Status | Approved |
| Compliance Officer Messags | |

FIG. 7J

Terrina Planincic
Freelance Lawyer
The Freelance Lawyer #1

ⓘ Please click on your preferred starting hour and date that is represented in green Choose a date:  Timezone:

22/07/2019  Australia/Brisbane today  < >

July 29, 2019

| | Monday |
|---|---|
| all-day | |
| 3pm | |
| 4pm | |
| 5pm | |
| 6pm | |

FIG. 7K

COMPUTER PLATFORM AND METHOD FOR SECURELY EXCHANGING CONFIDENTIAL DATA AND GENERATING LEGAL DOCUMENTS

PRIORITY CLAIM

This application claims priority to U.S. Provisional App. Ser. No. 62/879,477, filed Jul. 28, 2019, which is hereby incorporated by reference in its entirety.

BACKGROUND OF INVENTION

Field of the Invention

The present disclosure relates to improvements in systems and methods for securely exchanging confidential data and compiling legal documents and/or performing certain legal actions using the confidential data.

Brief Description of Related Art

Conventional systems exist which prepare documents according to user information. However, such systems are prone to security flaws and are a hacking risk. Further, such systems are often hard to use and clunky, taking an inordinate amount of time to generate a requested document or perform a particular legal action. Accordingly, there exists a need to provide an improved system, platform and method less prone to the security flaws inherent in prior art systems, and more user-friendly and efficient to generate user-requested and/or unrequested documents, and/or perform user-requested legal actions.

It will be clearly understood that, if a prior art publication is referred to herein, this reference does not constitute an admission that the publication forms part of the common general knowledge in the art in the U.S.A., Australia or in any other country.

BRIEF SUMMARY OF THE INVENTION

The present invention in one preferred aspect provides for a computer-implemented platform for providing secure exchange of confidential data. The platform includes a user database including at least one user profile, the user profile including user contact details and user identification data. The platform further includes a verification module for verifying the identity of a user attempting to access the platform, said verification module being configured to utilize biometric data to verify the user by comparing the biometric data against user biometric data stored in said user profile. The platform also includes a legal database including data useable according to legal requirements of a specific legal jurisdiction. The platform also includes a geographical engine configured to utilize geographical location data associated with the user's computing device and tag the user as being associated with a specific legal jurisdiction. The platform also includes a compiler configured, in response to a user inquiry, to compile a legal document compatible according to specific legal standards of the identified jurisdiction associated with the user based on the geographical location of the user's computing device determined by said geographical engine.

In another preferred aspect, the present invention provides a method for compiling a legal document based on a user location and identity. The method includes verifying user identity with a biometric comparison of the user with biometric data of the user stored in a user database; determining a geographical location of a computing device used by the user, the determining including utilizing an IP address being used by the user computing device; receiving a user inquiry regarding a legal form needed for a user legal situation; compiling the legal form according to legal requirements associated with the determined geographical location; encrypting the compiled legal form; and sending the encrypted compiled legal form to the user device.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

It will be appreciated that reference herein to "preferred" or "preferably" is intended as exemplary only. The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1B is a screen shot of a web dashboard process for verifying a user as part of the platform of FIG. 1A.

FIG. 2 shows a general algorithm for registering a company with a governmental agency in accordance with another aspect of the platform of FIG. 1A.

FIG. 3 shows a general algorithm for posing a series of user inquiries for compiling a legal document in accordance with another aspect of the platform of FIG. 1A.

FIG. 4 shows a general algorithm for performing a subject search in accordance with another aspect of the platform of FIG. 1A.

FIG. 5 is a pair of screen shots configured for a legal professional to create an online legal practice by setting up hours of operation, bank account and payment details as an aspect of the platform of FIG. 1A.

FIG. 6 shows an illustration of data encryption of sensitive user data in accordance with another aspect of the platform of FIG. 1A.

FIGS. 7A-K show screen shots of a user booking a video session with an advisor, and how the advisor uses a chat function to take notes on client advice which complies with local legal requirements, and recording and securely storing a confidential video session.

DETAILED DESCRIPTION

Reference will now be made in detail to the present preferred embodiments of the invention, examples of which are illustrated in the accompanying drawings.

Figure 1A:
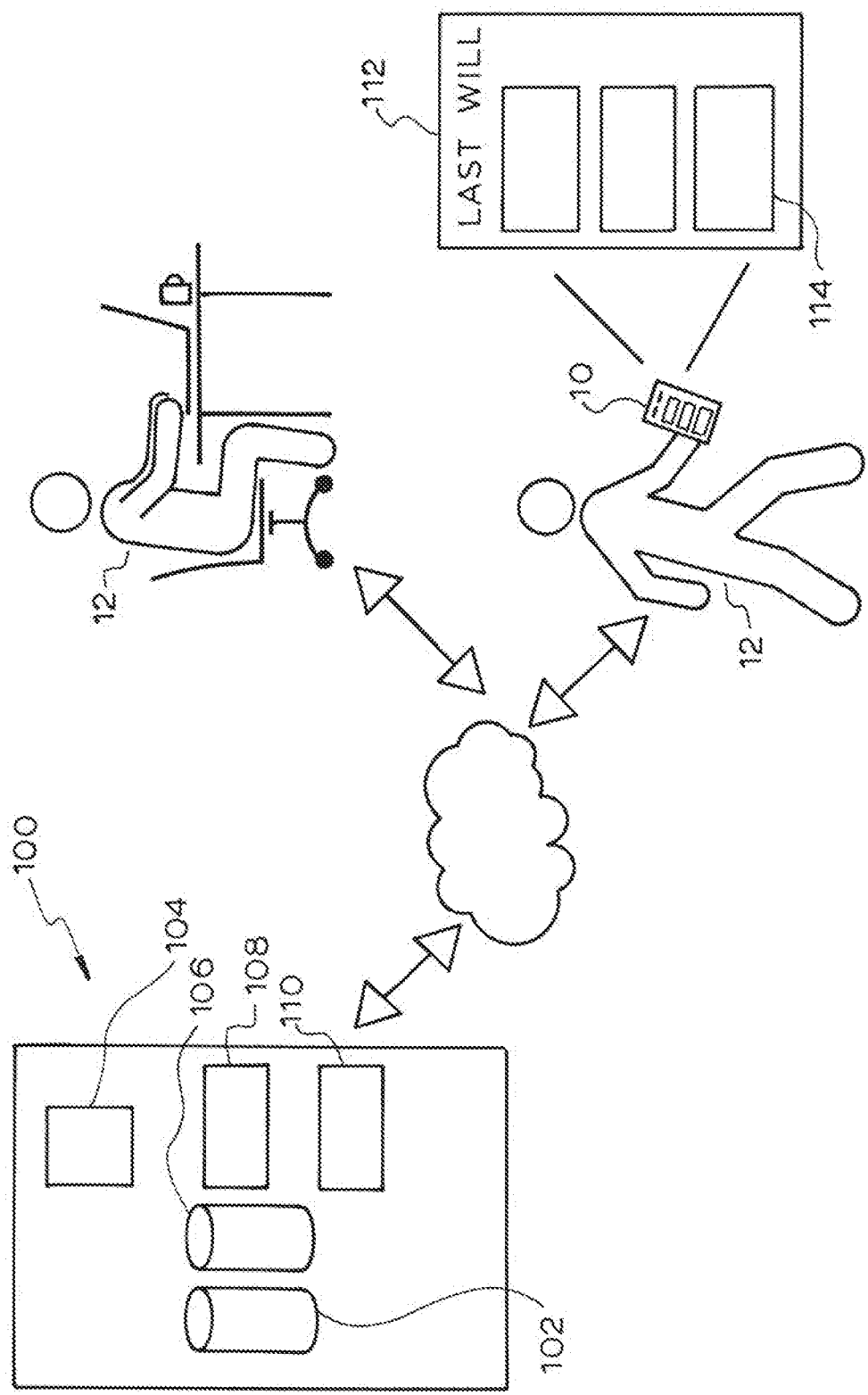
FIG. 1A is a diagrammatic view of an overall system and platform for providing a secure creation and exchange of confidential data in accordance with a preferred embodiment of the present disclosure.

FIG. 1A shows a system or platform 100 having a user database 102, a verification module 104, a legal database 106, a geographical engine 108, and a compiler 110. In use, a user 12 uses their device 10 and accesses platform 100. Verification module 104 verifies the identity of user 12. User 12 submits a request for a particular document to be created, usually a legal document. Legal database 106 is consulted regarding the particular legal requirement of the document that interests the particular user. The request is analyzed by geographical engine 108 to determine the location of user device 10 so that the legal requirements of the particular jurisdiction are adhered to as best as possible when responding to the user request. Compiler 110 compiles a document requested by user 12, after the geolocation of the user device and the document type is determined. The requested document is then provided to user 12. The preferred elements of platform 100 and their interrelationship are described below.

Referring to FIG. 1A, user database 102 is preferably configured to store a plurality of user profiles, along with contact data, and preferably additionally, user biometric data such as facial recognition data and/or voice recognition data. It will be appreciated that other biometric data may be stored if desired, such as fingerprint, retinal image data, and user hand movement or body mannerisms. Naturally, such data is highly confidential, so it is preferred that such data is securely stored to minimize the chances of a malicious procurement of such information by unauthorized entities or persons.

In order to enhance security of the platform, verification module 104 is configured to verify the identity of user 12 prior to substantive user access of the platform. Identity verification may be through a variety of ways, for example only, biometric user identification and/or password entry. Preferably multiple (e.g., at least two) features are used to identify a user. Once a user is verified, the user is granted access to certain components of the platform to build requested documents or perform particular legal actions.

Platform 100 further includes legal database 106 that preferably includes data usable according to the legal requirements of a specific legal jurisdiction. Legal database 106 preferably contains legal data on a variety of topics of legal relevance, such as family law, employment law, tax law, corporations (business entities) law, criminal law, tort law, administrative law, intellectual property law, and local rules and ordinances, regulations, statutes, guidelines, and codes. Preferably, legal database 106 will have access to the legal data of a variety of jurisdictions at multiple different levels of government. If desired, legal database 106 may include a search engine to help find data not readily contained in legal database 106, so that a user query may be efficiently fulfilled.

Geographical engine 108 is preferably configured to determine the location of a user device 10. Geographical engine 108 may be configured to geotag data to facilitate matching of applicable law with a request or function. The location of the user device may be determined in a variety of ways, for example only, with an IP address, global positioning system (GPS) data, cell phone triangulation methods, and other methods as would be appreciated by those of ordinary skill in the art, and therefore omitted for simplicity.

Geographical engine may incorporate an element of artificial intelligence to assist in the location determination of the user device, for example, by analyzing and predicting user movement patterns and schedules.

Compiler 110 is preferably a computer processor (or series of processors) preferably programmed to carry out instructions and compile requested or needed documents and/or perform particular tasks. The compiling preferably takes into account the jurisdictional location of the user device to help ensure the prepared documents are legally compliant with governmental law. Compiler 110 may also be configured to carry out requested actions without producing any documents, depending upon the particular situation. For example, where a new business is being created, compiler 110 may be configured to gather any needed data and populate any data fields required by a governmental organization to create the business entity. Any documents that might be needed and signed could be created electronically and digitally signed using a user digital signature stored in the user profile. Naturally, use of digital signatures would preferably involve a high level of security, which may be provided by verification module 104.

Platform 100 may be used to create a variety of legal documents, and/or carry out certain legal actions in an efficient and secure manner.

Referring to FIG. 1B, platform 100 preferably includes a dashboard 102 configured to permit an interested user to utilize the platform. Interested users may include a professional, such as a lawyer or related legal professional, for example, paralegal or legal secretary. Interested users may also include a potential or actual client wishing to procure one or more legal documents custom-formatted for the client's jurisdiction and situation.

As shown in FIG. 1B, dashboard 116 includes an interface for verification module 104 that the user is preferably obligated to use before proceeding to access additional components of the platform. The interface for verification module 104 may include data fields for obtaining user identification data, such as, for example only, date of birth (DOB), contact address, phone number and/or e-mail. Module 104 preferably includes a portal 118 enabling uploading of documents such as a passport or driver's license. Verification module 104 preferably includes multiple data security features, such as biometric user identification and/or password entry. Examples of biometric data include facial recognition, voice recognition, fingerprint(s), hand movement and/or body mannerisms.

It will be appreciated that dashboard 116 may include one or more interfaces for other modules accessible to the user, particularly after a successful identification verification.

Referring now to FIG. 2, a preferred process of registering a company with a governmental organization is illustrated. In this example, FIG. 2 shows an algorithm 120 for registering a company with the Australian Securities and Investments Commission (ASIC). A user will first conduct a name availability search. Next, the user fills in various fields pertaining to proposed company details. Thereafter, certain of such details (for example, addresses) are independently verified by platform 100, preferably while the user is entering other data. If one or more items of data produce an error result (conflict between data entered and known data references), the user is informed of the error and may correct the data entered. Once the application is complete (all necessary data entered into the data fields), the application is evaluated and approved or declined. If approved, a registration certificate typically issues very quickly. Thus, a user may use the platform to register the company without a legal or business professional if desired, to save money and time.

Referring now to FIGS. 1A and 3, a preferred process of creating a document is illustrated. FIG. 3 shows a document creation process 122 that may form part of a, for example only, document wizard, or compiler. Compiler 110 preferably is configured to assemble a document, such as a legal document, according to specific legal standards of an identified jurisdiction associated with the user wanting to assemble the document. The compiler preferably uses the user's geographical location of the user's computing device 10 (e.g., mobile phone, tablet device, laptop computer, or desktop computer) to determine with geographical engine 108 the user device location. The user device location may be obtained in a variety of ways, for example only, an internet IP address, a GPS signal given by the user device, or other data that may be used to determine device location.

FIG. 4 illustrates an exemplary search process 124, preferably utilizing the GlobalX applications programming interface (API).

FIG. 5 shows a pair of screenshots 126 of an online legal firm creation process, which is just an example of the type of online organization that may be created with platform 100. As part of the exemplary process, a data field 128 for hours of operation, and a data field 130 for bibliographical data may be completed by a user wishing to use platform 100 to create, in this example, an online, virtual legal firm. It will be appreciated that other data fields may be included, such as bank account data to enable online transactions.

Referring now to FIG. 6, an example of preferred data encryption criteria 132 is listed. Data encryption is a preferred feature of platform 100 to help enhance security of confidential information. Examples of various encryption techniques are listed in FIG. 6.

Figure 7D:
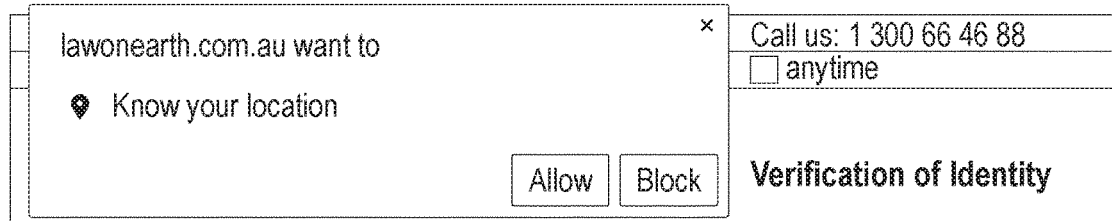
Figure 7G:
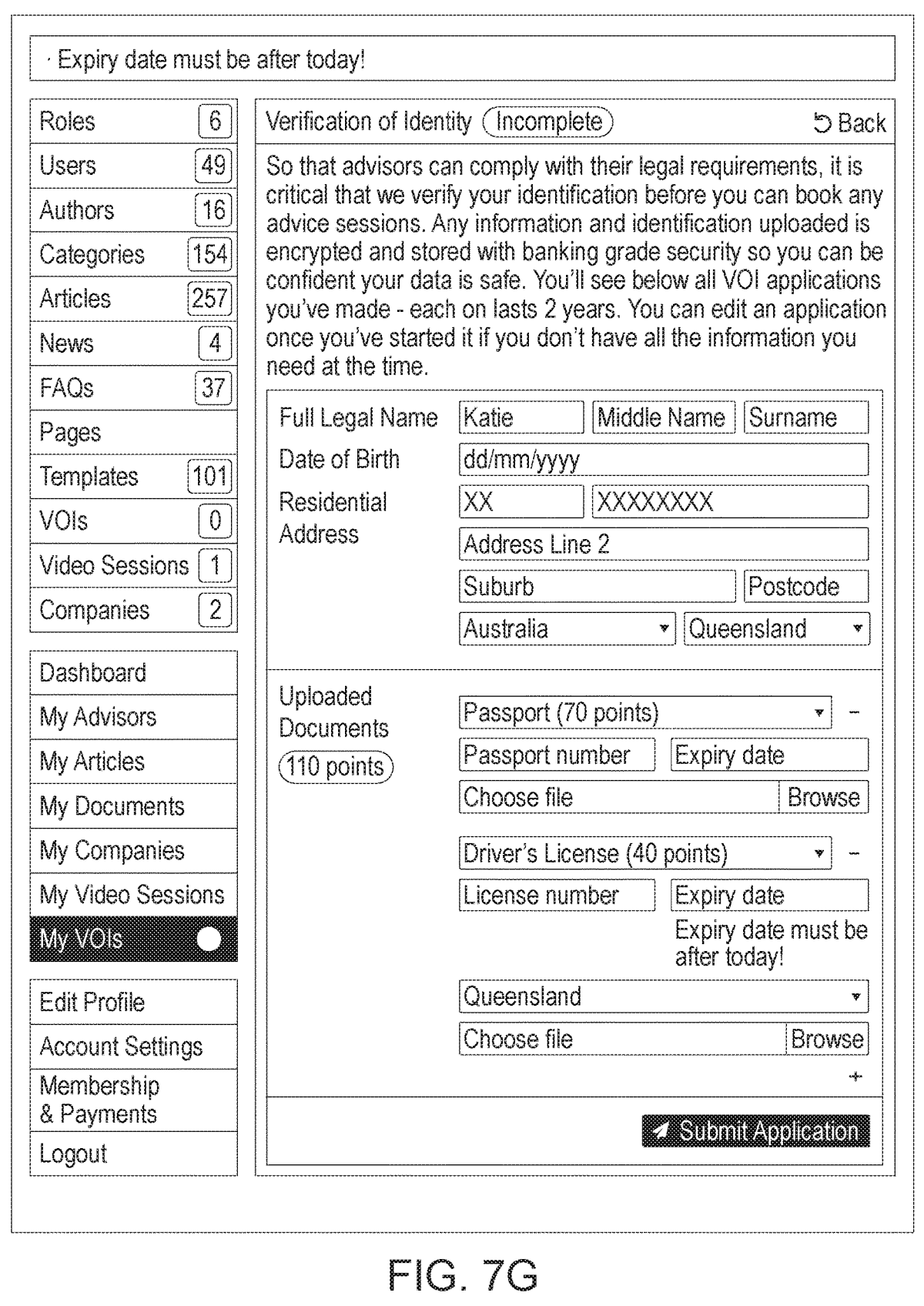

FIGS. 7A to 7K show a series of screen shots of a user booking a video session with an advisor, and how the advisor uses a chat function to take notes on client advice which complies with local legal requirements, and recording and securely storing a confidential video session. FIG. 7A shows a screenshot of an advisor profile geographically located in the state of Queensland (Australia). FIG. 7B shows a screenshot 134 of an advisor that in this example includes a compensation lawyer 136. Screenshot 134 lists the lawyer's profile 138, which in this example, includes the states of practice and a concise biography. Screenshot 134 further preferably includes an advisor contact form 140 that an interested user may complete to contact lawyer 136. An auto-conflict check may scan any entered text to perform a conflict check. The auto-conflict check can compare text scanned with certain key words or phrases from existing profiles on the platform.

If desired, the platform may be configured so that a video session with an advisor may be booked with an advisor who is currently indicated as being available online, and/or booked directly from any article the advisor wrote for an associated learning center module. For example, the advisor article may include one or more hypertext links to a booking site.

Preferably, before an interested user is permitted to contact a lawyer, the user is verified, that is, the user's identification is verified, preferably by verification module 104. The verification module may be configured to verify a user in a number of ways, for example only, biometrically, challenge questions, or password or PIN information. Examples of biometric data verification includes, without limitation, facial recognition, voice recognition, fingerprints, and/or body movement mannerisms, such as hand-movement. A person of ordinary skill in the art would appreciate the various biometric techniques without the need for particular detail. Therefore, explicit details of such techniques are omitted for simplicity.

FIG. 7D illustrates an exemplary screenshot 142 of verification module 104 having a number of data entry fields 114. Typical data entry fields may include, without limitation, user name and contact details, address, and other items of data such as described above already. Verification module 104 further preferably includes an upload document interface 144 to upload sensitive documents such as a driver's license or passport.

Having described the preferred components of platform 100, a preferred method of use will now be described. A legal document is compiled based on a user location and identity, including: verifying user identity with a biometric comparison of the user with biometric data of the user stored in a user database; determining a geographical location of a computing device used by the user, the determining including utilizing an IP address being used by the user computing device; receiving a user inquiry regarding a legal form needed for a user legal situation; compiling the legal form according to legal requirements associated with the determined geographical location; encrypting the compiled legal form; and sending the encrypted compiled legal form to the user device.

The verification may include the use of facial recognition technology to identify the user. The verification may alternatively, or in addition, may utilize voice recognition technology to identify the user.

Historical behavioral data of the user and user personal data may be used to compile supplemental or ancillary legal documents identified as being ordinarily filed in conjunction with the primary legal document being compiled for the user.

The method may also include consulting at least one independent legal database containing legal data regarding the user, further including utilizing data obtained from the independent legal database to supplement the legal document for the user. The data obtained from the independent legal database may be used to compile a legal document unrequested by the user.

The method may also include using a classifier to classify the historical behavioral data and the user personal data to compile the legal documents, wherein the classifier includes a neural network. The details around the operation and use of a neural network for classification would be appreciated by those of ordinary skill in the art, and therefore are not repeated herein for simplicity.

It will be appreciated that the steps described above may be performed in a different order, varied, or omitted entirely without departing from the scope of the present invention.

The foregoing description is by way of example only, and may be varied considerably without departing from the scope of the present invention. For example only, the platform may be used to perform actions in addition to, or instead of creating legal documents. For example, as noted above, the platform may be used to create a legal entity, or file for different interest, such as a trademark application.

The platform may be configured to include a corporate portal to allow an employer to offer advice sessions to staff or employees as an employee perk. This may be particularly beneficial in larger corporations, organizations, or government divisions.

It will be appreciated that the platform has applicability outside of utilizing sensitive data to generate legal documents or perform certain legal actions. For example, the platform may be used as a virtual law firm to allow potential clients to access legal services efficiently and cost-effectively.

A chatbot may be included to assist a user to perform a variety of actions within the platform. The chatbot may be configured with elements of artificial intelligence to help guide users through the platform and any particular applications.

Principles of artificial intelligence would be appreciated by most computer programmers, and such details are not repeated here for simplicity.

Mental capacity algorithms may be used to ascertain a user's (potential client's, or client's) mental capacity, which becomes relevant when signing certain legal documents like contracts or wills.

If desired, the platform may include an algorithm and search engine to data mine data from one or more social platforms, preferably with user permission, to help supplement the user profile.

Optical Text Recognition (OCR) may be included as a feature of the platform to easily electronically include data from paper forms. Such would be useful when seeking to build, for example, elements of legal database 106.

A risk reporting feature may be included which permits a risk analysis and provides a risk level in conjunction with an area of interest (e.g., business). The risk reporting feature may be implemented, for example only, through a user-quiz or series of questions, optionally in conjunction with an algorithm that takes into account the legal situation of the user, for example only, a divorce situation. In a divorce situation, a risk score may be determined for severing joint tenancies, changing an address, obtaining a new will or power of attorney, and so on. The presence or absence of certain documents or actions, such as already mentioned, will influence the risk score for the particular situation.

Elements of the platform may be configured specifically for use with mobile devices. For example, where a fingerprint biometric is utilized, many mobile phones have a fingerprint scanner to facilitate fingerprint identification.

One or more guides may be provided as an inherent feature of the platform so that the user is provided with a guide explaining the nature of the document being provided in conformity with local, state and/or country law. The guide may be prepared with a natural language text to make it more understandable to a user. The natural language may be configured based on geographical location of the user device (e.g., someone based in Australia will have different terminology compared to someone based in the Southern U.S.).

It will be appreciated that aspects of the platform and method may be used in fields other than in a legal field, for example, in certain trades or industries (e.g., the travel or banking industry). Other examples include, without limitation, medical, accounting, and life budgetary planning. The security and user/platform interaction aspects are particularly well-suited for the medical field and the handling of confidential medical data.

One or more embodiments of the present invention in a preferred form provides the advantages of more efficient and secure document creation that often accompanies systems in the prior art. Many services that formerly required in-person visits with a professional may now be accomplished securely and remotely, and more quickly since a client is often not waiting on the professional to perform a needed task. The platform, in one or more embodiments, also provides an enhanced level of security, which is important due at least to the increased risk of unauthorized accessing of sensitive documents and information. Data security, especially in legal environments and user identification and authorization, is becoming more important in modern society.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for providing secure exchange of confidential data, said system being computer-implemented and comprising:
    a user database including at least one user profile, the user profile including user contact details and user identification data including user biometric data;
    a verification module configured, in response to biometric data received from a computing device being used by a user attempting to access the system, to verify the identity of the user by comparing the biometric data received from the computing device being used by the user against user biometric data stored in said user profile;
    a legal database including data useable according to legal requirements of a specific legal jurisdiction;
    a geographical engine configured to utilize geographical location data associated with the computing device being used by the user and to tag the user as being associated with a specific legal jurisdiction; and
    a compiler configured, in response to an inquiry received from the computing device being used by the user, to compile a legal document compatible according to specific legal standards of the identified jurisdiction associated with the user based on the geographical location of the computing device being used by the user determined by said geographical engine;
    wherein said system is further configured to send the compiled legal document to the computing device being used by the user.

2. The system of claim 1, wherein the verification module is configured to use facial recognition to identify the user.

3. The system of claim 1, wherein the verification module is configured to use voice recognition to identify the user.

4. The system of claim 1, wherein said compiler is configured to utilize historical behavioral data of the user and user personal data to compile supplemental or ancillary legal documents identified as being ordinarily filed in conjunction with the legal document compiled for the user.

5. The system of claim 1, wherein said compiler is configured to consult at least one independent legal database containing legal data regarding the user, said compiler being configured to utilize data obtained from said independent legal database to supplement the legal document for the user.

6. The system of claim 5, wherein said compiler is configured to utilize the data obtained from said independent legal database to compile a legal document unrequested by the user.

7. A method for compiling and sending an encrypted legal document to a user based on the location of the user and the identity of the user, the method comprising:
    verifying the identity of the user by comparing biometric data obtained from a scan of the user using a computing device used by a user with biometric data of the user stored in a user database;
    determining a geographical location of the computing device used by the user, the determining including utilizing an IP address being used by the computing device being used by the user;
    receiving a user inquiry via the computing device being used by the user regarding a legal form needed by the user;
    compiling the legal form according to legal requirements associated with the determined geographical location of the user and other user data stored in the user database;

encrypting the compiled legal form; and sending the encrypted compiled legal form to the computing device being used by the user.

8. The method of claim 7, wherein the verification includes the use of facial recognition technology to identify the user.

9. The method of claim 7, wherein the verification includes the use of voice recognition technology to identify the user.

10. The method of claim 7, further comprising utilizing historical behavioral data of the user and user personal data stored in the user database to compile supplemental or ancillary legal documents identified as being ordinarily filed in conjunction with the legal document compiled for the user.

11. The method of claim 7, further comprising querying at least one independent legal database containing legal data regarding the user, and including the legal data regarding the user obtained from the at least one independent legal database to supplement the legal document compiled for the user.

12. The method of claim 11, further comprising utilizing the data regarding the user obtained from the at least one independent legal database to compile a legal document unrequested by the user.

13. The method of claim 10, further comprising using a classifier to classify the historical behavioral data and the user personal data to compile the supplemental or ancillary legal documents, wherein the classifier includes a neural network.

* * * * *